United States Patent
Willhoeft et al.

(10) Patent No.: US 7,295,298 B2
(45) Date of Patent: Nov. 13, 2007

(54) DETECTION METHOD AND A DETECTION APPARATUS

(75) Inventors: Volker Willhoeft, Hamburg (DE); Ulrich Lages, Hamburg (DE)

(73) Assignee: IBEO Automobile Sensor GmbH, Hamburg (DE)

(*) Notice: Subject to any disclaimer, the term of this patent is extended or adjusted under 35 U.S.C. 154(b) by 565 days.

(21) Appl. No.: 10/479,448

(22) PCT Filed: Jun. 3, 2002

(86) PCT No.: PCT/EP02/06057

§ 371 (c)(1),
(2), (4) Date: Apr. 20, 2004

(87) PCT Pub. No.: WO02/099458

PCT Pub. Date: Dec. 12, 2002

(65) Prior Publication Data

US 2004/0175183 A1    Sep. 9, 2004

(30) Foreign Application Priority Data

Jun. 5, 2001   (DE) .............................. 101 27 204

(51) Int. Cl.
*G01J 1/42* (2006.01)
(52) U.S. Cl. .................... 356/219; 250/206.1
(58) Field of Classification Search ................ 356/219, 356/141.1, 3.01–3.15, 4.01–5.15, 139.03–13; 250/221, 201.1, 208.1, 206.1, 206.2; 340/426.16, 340/436, 903, 435
See application file for complete search history.

(56) References Cited

U.S. PATENT DOCUMENTS 6,317,202 B1 * 11/2001 Hosokawa et al. ...... 356/141.1
6,580,385 B1 *  6/2003 Winner et al. ................ 342/70

FOREIGN PATENT DOCUMENTS

DE    33 22 528 A1    1/1985

(Continued)

OTHER PUBLICATIONS

Becker, J.C., "Fusion of Heterogeneous Sensors for the Guidance of an Autonomous Vehicle", Proceedings of the Third International Conference on Information Fusion, Jul. 10-13, 2000, Paris, France, pp. WeD5-11-18.
Stiller, et al, "Multisensor Obstacle Detection and Tracking", Image and Vision Computing 18, 2000, p. 389-396.

(Continued)

*Primary Examiner*—Layla G. Lauchman
*Assistant Examiner*—Tri Ton
(74) *Attorney, Agent, or Firm*—Harness, Dickey & Pierce, P.L.C.

(57) ABSTRACT

The invention relates to a method for optically sensing the surrounding area of a vehicle using at least one optoelectronic emitting/receiving device that is mounted on the vehicle. According to the method, a monitoring area located in the field of vision of the emitting/receiving device is scanned and, in addition to the monitoring area, a region of particular interest is scanned by using at least one radiation deflecting device, which is located in the field of vision of the emitting/receiving device, however, outside of the monitoring area. The invention also relates to a corresponding sensing device.

24 Claims, 1 Drawing Sheet

FOREIGN PATENT DOCUMENTS

Figure 1:
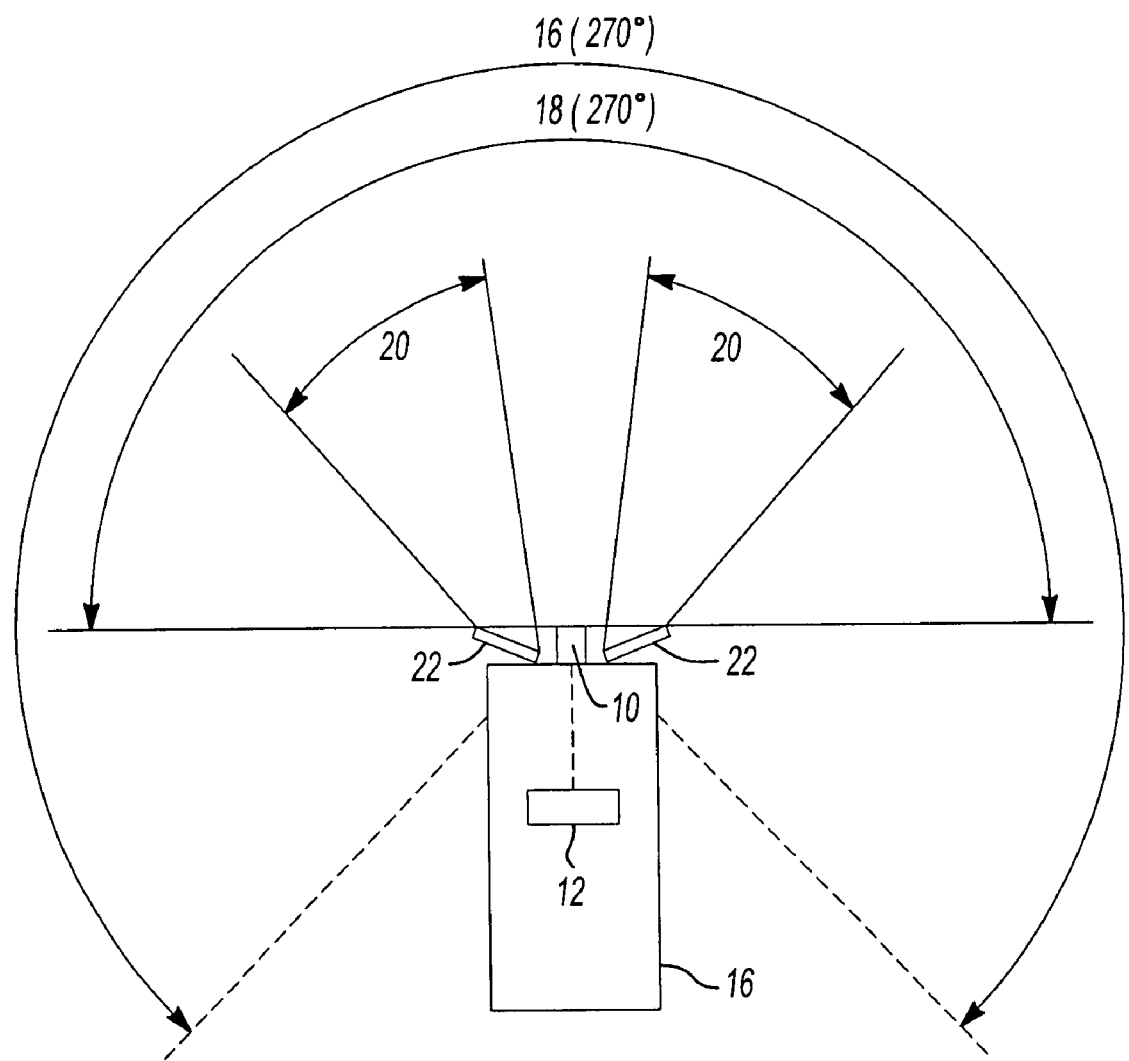

| | | |
|---|---|---|
| DE | 35 15 428 A1 | 10/1986 |
| DE | 38 27 879 C1 | 8/1989 |
| DE | 41 07 850 A1 | 6/1992 |
| DE | 41 37 068 A1 | 6/1993 |
| DE | 195 30 281 A1 | 2/1997 |
| DE | 296 20 357 U1 | 3/1997 |
| DE | 696 04 584 T2 | 6/1998 |
| DE | 197 28 626 A1 | 1/1999 |
| DE | 199 32 779 A1 | 1/2001 |
| WO | 97/08524 | 3/1997 |

OTHER PUBLICATIONS

Dipl.-Ing. Andreas Ewald, Dipl.-Ing. Volker Willhoeft, "Laser Scanners for Obstacle Detection in Automotive Applications", Proceedings of the IEEE Intelligent Vehicles Symposium 2000, Dearborn, Mich., USA, Oct. 3-5, 2000, pp. 682-687.

International Search Report for PCT/EP02/06057; ISA/EPO; Date of Completion: Aug. 28, 2002.

English Translation of German Search Report for German Applcation No. 101 27 204.9; German Patent and Trademark Office; Date of Completion: Sep. 17, 2003.

* cited by examiner

DETECTION METHOD AND A DETECTION APPARATUS

CROSS-REFERENCE TO RELATED APPLICATIONS

This application is a US National Stage of International Application No. PCT/EP02/06057 filed 3 Jun. 2002 (03.06.2002). This application claims the benefit of German Application No. 101 27 204.9, filed 5 Jun. 2001 (05.06.2001). The disclosure(s) of the above applications are incorporated herein by reference.

The invention relates to a method and to an apparatus for the optical detection of the environment of a vehicle using at least one optoelectronic transmitter/receiver attached to the vehicle.

Such optoelectronic transmitter/receivers, which are also simply termed sensors in the following, have a field of view which is scanned for the detection or monitoring of the vehicle environment. Only objects or movements lying in this field of view can be detected by the sensor.

It is the object of the invention to provide a possibility to use an optoelectronic transmitter/receiver attached to a vehicle in as many ways as possible, with the cost and/or effort for this being as low as possible.

This object is satisfied, on the one hand, by the features of the independent method claim and in particular in that, in the method, a monitored zone lying in the field of view of the transmitter/receiver is scanned and a region of particular interest is scanned in addition to the monitored zone by means of at least one radiation deflection device arranged in the field of view of the transmitter/receiver, but outside the monitored zone.

DRAWINGS

FIG. 1 is a schematic top view of an exemplary embodiment of an optical detection apparatus and is a new sheet.

DETAILED DESCRIPTION

In accordance with the invention, the field of view of the transmitter/receiver or of the sensor is partly deflected or redirected by the radiation deflection device, which is also simply termed a mirror device in the following. The sensor can also thus "look" in directions which are lying outside its actual field of view. The monitored zone or detected zone visible to the sensor can be expanded in this manner. The invention hereby opens up a variety of additional application possibilities. An advantage of the invention consists in particular of the fact that additional sensors or additional transmitter/receivers are not required.

The deflection device or mirror device can be an arrangement with one or more mirror surfaces. A plurality of separate arrangements can also be used which each have one or more mirror surfaces.

In accordance with the invention, it is basically possible to provide a camera, e.g. a video camera, as the optoelectronic transmitter/receiver or sensor with which the scanning of the field of view takes place in that images of the field of view are taken and subsequently evaluated.

However, in accordance with a practical embodiment of the invention, it is particularly preferred to use a laser scanner as the optoelectronic scanner. This is preferably a laser scanner which transmits a laser beam in at least one scanning plane and repeatedly sweeps over generally any desired pre-determined angular range of up to 360° with this scanning beam. The distance to the objects reflecting the transmitted scanning beams is preferably determined using the light propagation time method. The scanning radiation can lie both in the wavelength range visible to the human eye and outside this range. A laser scanner is preferably used which supplies an angular value related to a pre-determined axis of the scanner for each distance value. The sensor can generally also be a laser range finder without a scanning beam carrying out scanning movements. Such a device is also termed a fixed-beam laser scanner.

The vehicles can generally be any desired, even self-propelled vehicles, with the invention preferably being used in connection with passenger cars and trucks.

The region of particular interest, which is also termed the "region of interest" (ROI) in the following, is e.g. a region lying outside the monitored zone. Consequently, part of the field of view of the sensor taken up by the mirror device is replaced by a region of the vehicle environment lying outside the field of view into which the sensor could not "look" without the radiation deflection device.

Alternatively, or additionally, it is also possible in accordance with the invention for at least part of the monitored zone to be selected as the ROI. Consequently, part of the monitored zone lying in the field of view of the sensor is scanned a plurality of times, namely once in the "normal" or "direct" scanning of the field of view and at least one further time via the mirror device. The mirror device preferably has a plurality of individual mirrors or individual mirror surfaces for the radiation deflection.

A specific region of particular interest can be examined more precisely by the multiple scanning of at least part of the monitored zone possible with the invention than with only one single scan. The invention thus permits a more intensive observation of the respective ROI.

If, for example, when a laser scanner is used, the field of view of the sensor including a specific angular range of e.g. 360°, 270°, 180° or 90° is swept over repeatedly by a transmitted scanning light ray, the part of the monitored zone corresponding to the ROI is scanned at least twice per scan of the field of view. The ROI can basically be scanned as often as desired per single scan depending on the design of the mirror device.

Furthermore, provision can be made by a corresponding design of the mirror device for the multiple scanning to take place from different directions. An ROI can thereby be observed more or less at different angles of view, whereby additional information on the ROI can be obtained.

In accordance with a further preferred embodiment of the invention, at least part of the field of view, in particular of the monitored zone, can be scanned in a plurality of different scanning planes via the mirror device when scanning the field of view of the sensor. A multi-line scan of the ROI can hereby be realized for example.

The scan can take place from different directions by an appropriate design of the mirror device even with a scan in a plurality of different scanning planes.

Provision is made in a further variant of the invention for a plurality of mirror devices arranged in series to be used.

In accordance with a particularly preferred embodiment of the invention, provision is made for the position of the mirror device to be changed. The ROI in the field of view of the sensor can hereby be displaced, whereby further advantageous application possibilities arise.

When a plurality of mirror devices arranged in series are used, their relative arrangement can be changed in accordance with the invention. The mirror devices can e.g. be tilted relative to one another.

The change in the position of the mirror device or of the mirror devices preferably takes place periodically.

In particular when a plurality of mirror devices arranged in series are used, a type of three-dimensional effect can be produced in the ROI by the mirror movements in that e.g. the ROI is scanned in a plurality of parallel scan lines. A quasi 3D object detection can hereby be realized in specific regions of the vehicle environment.

Provision is made in a preferred embodiment of the invention for the position of the mirror device to be changed in dependence on the situation. A feedback with the vehicle environment "seen" by the sensor can hereby be achieved, i.e. a reaction to changes in the vehicle environment is possible. The change of the mirror position preferably takes place automatically.

In a further preferred embodiment of the invention, provision is made for the region of particular interest to be displaced in dependence on information acquired by the scan by adjusting the mirror device. The ROI can hereby track an object detected e.g. during the scan, whereby the sensor can more or less "keep an eye" on an object such as a person at the curb once it has been detected.

A further preferred embodiment of the invention provides that at least one control signal is produced for the control of a vehicle device in dependence on information acquired by the scan in particular of the region of particular interest.

The controllable vehicle device can in particular be the mirror device itself. It is, however, also possible, for example, to control the headlamps of the vehicle in order, e.g. after identification of a specific situation such as the passing of a construction zone, the presence of a road junction or the appearance of a person at the curb, to activate the vehicle headlamps, to deactivate them or to move them in accordance with the respective situation in order e.g. to better illuminate a specific region of the vehicle environment. In addition, in such or different situations, the driver or the person at the curb can be warned automatically in that e.g. a display device is activated at the dashboard or the vehicle horn is activated.

In accordance with a further embodiment of the invention, provision is made for the ground to be scanned, preferably in the direction of travel in front of the vehicle, via the mirror device. This ground monitoring preferably takes place at relatively low speeds of the vehicle. The ground in front of the vehicle can hereby be monitored, for example, for the occurrence of obstacles such as curbs, of markings such as lane boundaries, or of changes of the upward and/or downward gradient exceeding a pre-determined magnitude. The current upward or downward gradient can in particular be calculated and a warning signal can e.g. be emitted in good time before a pre-determined threshold is reached.

Furthermore, provision can be made in accordance with the invention for the scanning frequency to be increased by means of the mirror device at least with respect to part of the field of view of the sensor. The increase in the scanning frequency preferably takes place at relatively high speeds and can e.g. be automatically activated during an acceleration procedure when a pre-determined speed is reached.

In a further embodiment of the invention, provision can be made for a scan to be carried out in a plurality of scanning planes in the total field of view of the sensor. The additional scanning of the ROI in accordance with the invention by means of the mirror device already takes place starting from a multi-plane scan of the total sensor field of view permitting e.g. a quasi 3D effect.

The object underlying the invention is moreover satisfied in accordance with the invention by the features of the independent apparatus claim and in particular in that a monitored zone lying in the field of view of the transmitter/receiver can be scanned using at least one optoelectronic transmitter/receiver attached to the vehicle in operation and in that at least one radiation deflection device is provided which is arranged in the field of view of the transmitter/receiver, but outside the monitored zone and by means of which a region of particular interest can be scanned in addition to the monitored zone.

Reference is also made to the aforesaid recitation with respect to preferred embodiments of the detection apparatus in accordance with the invention.

In an embodiment of the detection apparatus, the mirror device is arranged at a marginal region of the field of view of the sensor. Two mirror devices are preferably provided, each arranged at a marginal region.

A laser scanner can, for example, be provided as the optoelectronic transceiver or as the optoelectronic sensor which has a field of view which covers approximately 270° and in which a scan of the vehicle environment takes place in one or more scanning planes. Mirror devices arranged at the two end regions of the field of view can, for example, be arranged and formed such that they each cover an angular range of approximately 45° of the field of view. A "normal" or "direct" monitored zone or detected zone of approximately 180°, which is sufficient for specific applications, thus remains between the two mirror devices. In the case of a sensor arranged, for example, in the front region of the vehicle, the half-space lying in front of the vehicle can thus be scanned directly, while additional detected zones or monitored zones with which regions of particular interest can be scanned are provided by the side "scan ears" which each cover approximately 45°.

The invention thus permits the use of one or more regions of the field of view of the transmitter/receiver, which are not necessarily required for a normal environmental detection or monitoring, as regions for particular detection or monitoring purposes.

In accordance with a further preferred embodiment of the invention, a control and evaluation unit is provided for the evaluation of information acquired by the scan and for the control of at least one vehicle device in dependence on the acquired information. In particular information acquired by the scan of the ROI serves as the basis for the control of the vehicle device.

The controllable vehicle device can in particular be the mirror device itself.

A preferred application of the invention is the detection of the upward gradient. The mirror device is used to observe the ground in the direction of travel in front of the vehicle provided with the sensor. This permits the identification of the respective downward gradient, of the respective upward gradient, of lane markings, of curbs and of other ground features. This ground detection or monitoring is preferably carried out at low speeds, e.g. on golf carts.

A further application of the invention is the multiplication of the scanning frequency in the "region of interest". A particularly reliable object identification and object verification can hereby be realized in hazardous zones and/or in dangerous situations. Possible situations are, for example, an increase in the vehicle speed and the verification of a detected object.

In a further application, a quasi 3D effect can be produced in the ROI in that, for example, by a slight tilting of a plurality of provided mirrors, their relative positions are changed. A plurality of part scan lines can e.g. be produced below one another in the ROI in this manner. This three-dimensional object detection is in particular of advantage in connection with hazardous zones and dangerous situations.

Furthermore, in accordance with the invention, not only a static arrangement, but also a dynamic arrangement of the mirror devices can be achieved. A dynamic mirror arrangement permits the visual zone of the mirrors, that is the respective ROI, to be aligned in real time and to be matched to the respective driving situation and also to displace the ROI. A situation-adaptive environmental scan is thus made possible which is not least of particular importance under safety aspects.

Furthermore, information on the ROI acquired from a scanning plane can be used by a corresponding alignment of the mirror device(s) for a multiple scanning in order to obtain more or more precise information on the object situation or on the environmental situation in the ROI in one or more scan steps.

Furthermore, after the detection and verification of critical situations or of critical traffic regions in the environment of the vehicle such as construction sites, road junctions and persons at the curb, the vehicle headlamps can be controlled, the driver warned, persons at the curb warned or other procedures triggered by the invention.

All variants of both the detection method in accordance with the invention and of the detection apparatus in accordance with the invention mentioned above and not contradicting one another can generally be combined with one another in any desired manner in order to achieve a detection or monitoring of the vehicle environment ideally matched to the respective application.

The invention claimed is:

1. A method for optical detection of the environment of a vehicle comprising at least one optoelectronic transmitter/receiver attached to the vehicle, in which
    scanning a monitored zone lying in the field of view of the transmitter/receiver,
    arranging at least one radiation deflection device in the field of view of the transmitter receiver, but outside the monitored zone,
    scanning a region of particular interest in addition to the monitored zone by means of the at least one deflection device; and
    storing information acquired from the scan in a memory of a control and evaluation unit.

2. A method in accordance with claim 1, characterized in that a laser scanner is used as the optoelectronic transmitter/receiver, in particular a laser scanner which measures distances and angles and which provides an angular value related to a pre-determined axis for each distance value in at least one scanning plane.

3. A method in accordance with claim 1, characterized in that a region lying outside the monitored zones is selected as the region of particular interest.

4. A method in accordance with claim 1, characterized in that at least part of the monitored zone is selected as the region of particular interest.

5. A method in accordance with claim 1, characterized in that, when scanning the field of view of the transmitter/receiver, at least part of the field of view, in particular of the monitored zone, is scanned a plurality of times via the deflection device, preferably from different directions.

6. A method in accordance with claim 1, characterized in that, when scanning the field of view of the transmitter/receiver, at least part of the field of view, in particular of the monitored zone, is scanned in a plurality of different scanning planes via the deflection device, preferably from different directions.

7. A method in accordance with claim 1, characterized in that a plurality of deflection devices arranged in series are used.

8. A method in accordance with claim 1, characterized in that the position of the deflection device is changed.

9. A method in accordance with claim 1, characterized in that the relative arrangement of a plurality of deflection devices arranged in series is changed, in particular by tilting at least one deflection device.

10. A method in accordance with claim 1, characterized in that the position of the deflection device is changed, in particular automatically, in dependence on the situation.

11. A method in accordance with claim 1, characterized in that the region of particular interest is displaced in dependence on information acquired by the scan by adjusting the deflection device.

12. A method in accordance with claim 1, characterized in that at least one control signal is produced for the control of a vehicle device in dependence on information acquired by the scanning in particular of the region of particular interest.

13. A method in accordance with claim 1, characterized in that, in particular at relatively low speeds of the vehicle, the ground is preferably scanned via the deflection device in the direction of travel in front of the vehicle.

14. A method in accordance with claim 1, characterized in that, in particular at relatively high speeds of the vehicle, the scanning frequency is increased by means of the deflection device at least with respect to part of the field of view of the transmitter/receiver.

15. A method in accordance with claim 1, characterized in that a scan is carried out in a plurality of scanning planes in the total field of view of the transmitter/receiver.

16. An apparatus for the optical detection of the environment of a vehicle having at least one optoelectronic transmitter/receiver attached to the vehicle in operation by means of which a monitored zone lying in the field of view of the transmitter/receiver can be scanned, and having at least one radiation deflection device which is arranged in the field of view of the transmitter/receiver, but outside the monitored zone, and by means of which a region of particular interest can be scanned in addition to the monitored zone.

17. An apparatus in accordance with claim 16, characterized in that the optoelectronic transmitter/receiver is made as a laser scanner, in particular as a laser scanner which measures distances and angles and which provides an angular value relative to a pre-determined axis for each distance value in at least one scanning plane.

18. An apparatus in accordance with claim 16, characterized in that a plurality of deflection devices are arranged in series.

19. An apparatus in accordance with claim 16, characterized in that the position of the deflection device can be changed.

20. An apparatus in accordance with claim 16, characterized in that the relative arrangement of a plurality of deflection devices arranged in series can be changed, in particular by tilting at least one deflection device.

21. An apparatus in accordance with claim 16, characterized in that the position of the deflection device is changed, in particular automatically, in dependence on the situation.

22. An apparatus in accordance with claim 16, characterized in that the deflection device is arranged at a marginal region of the field of view of the transmitter/receiver, with two deflection devices preferably being provided, each arranged at a marginal region.

23. An apparatus in accordance with claim 16, characterized in that a control and evaluation unit is provided for the evaluation of information acquired by the scan and for the control of at least one vehicle device in dependence on the acquired information.

24. An apparatus in accordance with claim 16, characterized in that a deflection device is provided as the controllable vehicle device.

* * * * *